(12) United States Patent
Wang et al.

(10) Patent No.: US 12,098,276 B2
(45) Date of Patent: Sep. 24, 2024

(54) ETCH RESISTANT COATINGS FOR ACID SENSITIVE STONES

(71) Applicant: LATICRETE INTERNATIONAL INC., Bethany, CT (US)

(72) Inventors: Suxin Wang, Bethany, CT (US); Rajeswari Kompalli, Bethany, CT (US); Eerik Maandi, Bethany, CT (US); Randall Bright, Bethany, CT (US); Kelsey R. Dadmun, Bethany, CT (US); Yunbo Chen, Woodbridge, CT (US); Scott R. Kowaleski, Seymour, CT (US)

(73) Assignee: Laticrete International, Inc., Bethany, CT (US)

( * ) Notice: Subject to any disclaimer, the term of this patent is extended or adjusted under 35 U.S.C. 154(b) by 759 days.

(21) Appl. No.: 16/882,657

(22) Filed: May 25, 2020

(65) Prior Publication Data
US 2020/0369882 A1    Nov. 26, 2020

Related U.S. Application Data

(60) Provisional application No. 62/851,928, filed on May 23, 2019.

(51) Int. Cl.
| | |
|---|---|
| C08L 75/16 | (2006.01) |
| C08K 5/541 | (2006.01) |
| C08K 5/5435 | (2006.01) |
| C08L 33/14 | (2006.01) |
| C08L 63/00 | (2006.01) |
| C08L 91/06 | (2006.01) |
| C09D 133/14 | (2006.01) |
| C09D 163/00 | (2006.01) |
| C09D 175/16 | (2006.01) |
| C09D 191/06 | (2006.01) |

(52) U.S. Cl.
CPC .............. *C08L 75/16* (2013.01); *C08K 5/541* (2013.01); *C08K 5/5435* (2013.01); *C08L 33/14* (2013.01); *C08L 63/00* (2013.01); *C08L 91/06* (2013.01); *C09D 133/14* (2013.01); *C09D 163/00* (2013.01); *C09D 175/16* (2013.01); *C09D 191/06* (2013.01); *C08L 2205/03* (2013.01)

(58) Field of Classification Search
CPC .......... C08L 75/16; C08L 33/14; C08L 63/00; C08L 91/06; C08L 2205/03; C08K 5/541; C08K 5/5435; C09D 133/14; C09D 160/00; C09D 175/16; C09D 191/06; C09D 175/04
See application file for complete search history.

(56) References Cited

U.S. PATENT DOCUMENTS

| | | | | |
|---|---|---|---|---|
| 2005/0020763 A1* | 1/2005 | Milic | ................... | C09D 175/04 524/437 |
| 2007/0048445 A1* | 3/2007 | DiMario | .............. | B62D 29/043 427/372.2 |
| 2009/0148603 A1* | 6/2009 | Goscha | .................... | B05D 5/08 427/256 |
| 2013/0164450 A1* | 6/2013 | Hobbs | .................. | C09D 175/04 524/507 |
| 2014/0357756 A1* | 12/2014 | Kampalli | ................ | C04B 14/22 523/122 |

FOREIGN PATENT DOCUMENTS

WO    WO-2017042175 A1 *   3/2017   ......... C08G 18/0866

* cited by examiner

*Primary Examiner* — Jessica M Roswell
(74) *Attorney, Agent, or Firm* — DeLio Peterson & Curcio LLC; Kelly M. Nowak

(57) ABSTRACT

Formulations and coatings that seal and protect sensitive natural porous stone, such as, calcareous stone from acid etching. The formulations include one-part and two-part formulations for coating calcareous stones in interior and exterior environments. Various formulations of the invention may include an acrylic hybrid polymer dispersion, a polyurethane dispersion binder, and water. The polyurethane dispersion binder may include one or more acrylic urethane hybrid polymer dispersions or acrylic dispersions or acrylic hybrid polymer dispersions. The acrylic hybrid polymer dispersion may be an epoxy-acrylic hybrid polymer dispersion. The two-part formulations may further include a first hydroxyl function acrylic binder dispersion and a second epoxy functional silane hardener that are mixed together to form the coatings of the invention.

16 Claims, 1 Drawing Sheet

ETCH RESISTANT COATINGS FOR ACID SENSITIVE STONES

BACKGROUND OF THE INVENTION

1. Field of the Invention

The present invention is directed to compositions and coatings that seal and protect sensitive natural stone, such as, calcareous stone, against acid etching.

2. Description of Related Art

Natural stone, brick, concrete and other porous substrates are used in interior and exterior applications. Natural stone is classified into several categories based on mineralogy and grain boundary structure. These factors influence the porosity and sensitivity to acids, water and oil-based food stains.

There are several commercially available surface treatments that prevent the staining and damage to natural stone. Natural stones that are calcareous-based (calcium carbonate) like-marble, limestone, travertine and onyx are porous, soft and sensitive to cleaning solutions. The porosity and sensitivity of these stones raises a need for sealers that protect the installed stone.

Currently available sealers and/or coatings provide some protection against water and oil-based staining agents; however, a need continues to exist for protecting calcareous-based stones from acids both in interior and exterior environments.

The present invention provides a solution to this problem by providing compositions and coatings that protect calcareous-based stones from acids both in interior and exterior environments.

SUMMARY OF THE INVENTION

Bearing in mind the problems and deficiencies of the prior art, it is therefore an object of the present invention to provide formulations and coatings that seal and protect sensitive natural porous stone, such as, calcareous stone.

Another object of the present invention is to provide various compositions suitable for use in formulations that seal and protect calcareous stone.

It is another object of the present invention to provide methods compositions and formulations for coating calcareous stone to protect such stone from acid etching.

A further object of the invention is to provide methods of applying formulations to provide coatings on calcareous stone that seal and protect such sensitive stones from damage.

It is yet another object of the present invention to provide one-part and two-part formulations that seal and protect sensitive calcareous stone, such as, honed calcareous stone and polished calcareous stone.

Another object of the present invention is to provide one-part and two-part formulations and coatings that protect calcareous-based stones from acids both in interior and exterior environments.

Still other objects and advantages of the invention will in part be obvious and will in part be apparent from the specification.

The above and other objects, which will be apparent to those skilled in the art, are achieved in the present invention which in one or more embodiments is directed to formulation comprising an etch resistant sealant for coating and protecting calcareous-based stones. The formulation includes an acrylic hybrid polymer dispersion, a polyurethane dispersion binder, and water. The polyurethane dispersion binder comprises at least a first acrylic urethane hybrid polymer dispersion. In embodiments of the invention the polyurethane dispersion binder may further include a second acrylic urethane hybrid polymer dispersion or acrylic dispersion. The acrylic hybrid polymer dispersion may be an epoxy-acrylic hybrid polymer dispersion.

In one or more embodiments the formulation may include the acrylic hybrid polymer dispersion being present in an amount ranging from 5-20 wt. %, the polyurethane dispersion binder being present in an amount ranging from 20-60 wt. %, and the water being present in an amount ranging from 15-25 wt. %, wherein all weight percentages are based on a total weight of the formulation. The formulations may further include a siloxane based defoamer or a benzoate ester plasticizer. In embodiments the present formulations may include one or more of the following: hydrophobic glycol ether, nonfoaming nonionic surfactant, fluoro-compound, wax additive, a blend of benzisothiazolin and 2-hydroxyethyl-triazine, freeze thaw stabilizers and co-solvents, plasticizers, in-can preservatives, a thickener, mineral clay, and/or a matting agent.

The formulations of the various embodiments of the invention may further include at least one wax additive present in an amount ranging from 3-25 wt % based on a total weight of the formulation. A fluoro-compound may also be present in an amount ranging from >0-20 wt % based on a total weight of the formulation.

Various embodiments of the invention may include formulations having acrylic hybrid polymer dispersion present in an amount of about 3 wt % to 70 wt % based on a total weight of the formulation, and polyurethane dispersion binder present in an amount of about >0 wt % to 70 wt % based on a total weight of the formulation. The formulations of the invention provide coatings on unpolished honed calcareous stones, or polished calcareous stones, whereby these coatings seal and protect the calcareous stones from etch and damage.

In one or more embodiments, the invention is directed to two-part etch resistant sealant formulation for coating and protecting calcareous stones, particularly, polished calcareous stones. The two-part etch resistant sealants include a part A composition being a hydroxyl function acrylic binder dispersion and a part B composition being an epoxy functional silane hardener. In these formulations, the Part A (first composition) and Part B (second composition) are present in the formulations in ratios ranging from 50-95 wt. % Part A to 50-5 wt. % Part B, based on a total weight percentage of the formulation.

In certain embodiments, the Part A (first) composition may include a hydroxyl functional acrylic dispersion as a binder, a fluoro-compound, and water. In the Part A composition, the hydroxyl functional acrylic dispersion may be present in an amount ranging from 10-80 wt. %, the fluoro-compound present in an amount ranging from 3-30 wt. %, and the water in an amount ranging from 3-15 wt. %, based on a total weight of the first composition. In certain embodiments, the Part A composition may further include a polyurethane dispersion as an adhesion promoter present in an amount ranging from 10-70 wt. %, based on a total weight of the first composition.

In various embodiments, the Part B (second) composition may include an epoxy/acrylic/methacrylic functional silane, a water-dispersible polyisocyanate, and water. The epoxy/acrylic/methacrylic functional silane may be present in an amount ranging from 2-30 wt. %, and the water-dispersible polyisocyanate in an amount ranging from 2-30 wt. %, based on a total weight of the second composition.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF THE PREFERRED EMBODIMENT(S)

In describing the preferred embodiments of the invention, reference will be made herein to FIGS. 1 and 2 of the drawings in which like numerals refer to like features of the invention.

The present invention is directed to compositions and formulations, and the resultant applied coatings thereof, for treating, sealing and protecting sensitive natural stone against acid etching. As used herein, the term composition refers to the different parts or constituents that make a whole, while formulation is the different parts/constituents mixed and prepared in accordance with the various formulas of the invention.

There are currently several commercially available penetrating sealers and coatings to protect natural stone, however, these currently available products merely protect natural stone from common household staining agents. While some of these known commercially available products work reasonably well for acidic stains on dense stones, such as, granite, slate, etc., they do not protect or seal soft, calcareous based stones from such corrosive acidic stains.

In accordance with the various embodiments, the invention is directed to compositions and formulations, along with the resultant applied coatings thereof, for treating, sealing and protecting sensitive soft, calcareous-based natural stones. These soft, calcareous-based natural stones may include, for instance, marble, limestone, travertine and onyx against acidic staining agents. The invention treats, seals, and protects soft, calcareous stone in both interior and exterior environments.

The various embodiments of the invention are directed to compositions and formulations that provide superior resistance to acid etching, as well as resistance to water and oil-based stains, for calcareous-based natural stones without altering the stones or stone surfaces. The present compositions and formulations may be used to both seal and protect polished, honed and/or textured natural stone. Performance of the compositions and formulations have been validated and show improved stain resistance, etch resistance, scratch resistance, water repellency, and oil repellency.

The compositions and formulations of the invention, and resultant applied etch resistant coatings on soft, calcareous-based stones, are water based, easy to apply, have low VOC and provide penetrating coatings that protect soft calcareous stones against acidic stains. It has been advantageously found that the compositions and formulations of the invention do not alter the surface appearance of the natural stone after being applied and coated thereon. The various compositions and formulations of the invention may be provided as one-part or two-part systems that are suitable for use as stone sealers, coatings, and protectants. The two-part systems of the invention include two (2) different compositions (e.g., Part A composition and Part B composition) that are mixed in a predetermined fixed ratio prior to use and application thereof. The resultant formulations of the invention form a coating that provides etch resistance and/or acid resistance protection as early as 4 hours after installation on natural, calcareous and/or sensitive stones. In one or more embodiments, it has been found that the dwell time of coatings of the invention are less than 30 minutes, depending on the environmental conditions.

Referring to Table 1 below, various compositions for use in the present formulations, as well as formulations of the invention are described therein. Each of the various formulations of the invention described in Table 1 provide etch resistant coatings for acid sensitive stones having a matte surface finish. In the below table, "Range 1" of compositions for the present formulations refers to a first preferred range, while "Range 2" refers to a second preferred range. The "Range 2" is provided into even further preferred one-part etch resistant sealing coatings (sealers) ranges, namely "Range 2A" for honed calcareous stones and "Range 2B" for polished calcareous stones. Honed calcareous stones are stones having surfaces that have been ground to a smooth, flat, consistent surface. For stones with a natural shine such as granite or marble, the polish or shine is removed leaving a matte (unpolished) surface with little to no reflection and no bumps or ridges. It is fairly porous and natural looking, and may be preferred for floors, stairs and other areas that must easily withstand foot traffic.

In accordance with one or more embodiments, various preferred embodiments and ranges of the formulations of the invention are described below in Table 1, wherein the range weight % is based on a total weight of resultant formulation.

TABLE 1

One Part Etch Resistant Coating Formulations for Acid Sensitive Stones

| Composition | Property/Characteristics | Range 1 (wt. %)* | Range 2 (wt. %)* | Range 2A (wt. %)* | Range 2B (wt. %)* |
|---|---|---|---|---|---|
| Water | DI Water | 10-80 | 10-80 | 10-80 | 10-80 |
| Acrylic Urethane hybrid polymer dispersion or acrylic dispersion | Binder/Dispersion | 3-50 | 3-70 | 5-70 | 10-70 |
| Epoxy-acrylic hybrid polymer dispersion | Binder/Adhesion promoter | 0-20 | 0-70 | 10-70 | 10-70 |
| Polyurethane dispersion | Binder/Adhesion promoter | 0-10 | 0-70 | 10-70 | 10-70 |

TABLE 1-continued

One Part Etch Resistant Coating Formulations for Acid Sensitive Stones

| Composition | Property/Characteristics | Range 1 (wt. %)* | Range 2 (wt. %)* | Range 2A (wt. %)* | Range 2B (wt. %)* |
|---|---|---|---|---|---|
| Hydrophobic Glycol Ether | Freeze Thaw Stabilizers/Co-Solvent | 0-5 | 0-10 | 0-10 | 0-10 |
| Hydrophylic Ethane-1,2-diol | Freeze Thaw Stabilizers/Co-Solvent | 0-5 | 0-10 | 0-10 | 0-10 |
| A blend of Benzisothiazolin and 2-Hydroxyethyl-triazine | In Can Preservative | 0.01-0.05 | 0.02-0.5 | 0.02-0.5 | 0.02-0.5 |
| Wax | Wax additive | 0-3 | 0-25 | 0-25 | 0-25 |
| Leveling agent | Leveling and flow additive | 0-3 | 0-5 | 0-5 | 0-5 |
| Defoamer | De-aerator | 0-1 | 0-5 | 0-5 | 0-5 |
| Matting agent | Inorganic or organic matting agents | 0-1 | 0-5 | 0-5 | 0-5 |
| Plasticizer | Plasticizer | 0-1 | 0-5 | 0-5 | 0-5 |
| Adhesion promoter | Silane adhesion promoter | 0-3 | 0-5 | 0-5 | 0-5 |
| Water borne silicone | Slippery and surface smoothness | 0-5 | 0-15 | 0-15 | 0-15 |
| Thickener | Alkali swellable acrylic emulsion | 0-1 | 0-5 | 0-5 | 0-5 |
| Fluoro-compound | Oil/water repellency | 0-11 | 0-15 | 0-15 | 0-15 |
| Nonfoaming, nonionic surfactant | Wetting agent | 0-1 | 0-5 | 0-5 | 0-5 |
| Benzoate Ester Plasticizer | Plasticizer | 0-2 | 0-5 | 0-5 | 0-5 |
| Siloxane based Defoamer | De-aerator | 0-1 | 0-5 | 0-5 | 0-5 |
| TOTAL FORMULATION | | 100% | 100% | 100% | 100% |

*Range weight % based on total weight of resultant formulation

The various compositions described in Table 1 may be mixed/blended in accordance with the weight percent range formulations described therein. In accordance with one or more embodiments, the resultant formulations and applied etch resistant coatings of the invention for etch/acid sensitive stones may have chemical structures as depicted in FIGS. 1 and 2.

Figure 1:
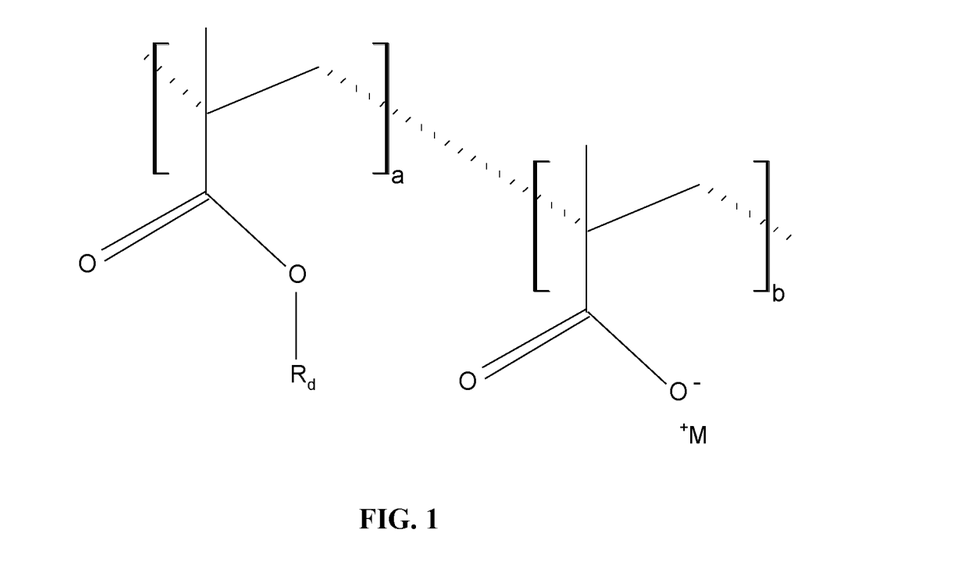
FIG. 1 depicts a chemical structure in accordance with one or more embodiments of the invention.
Figure 2:
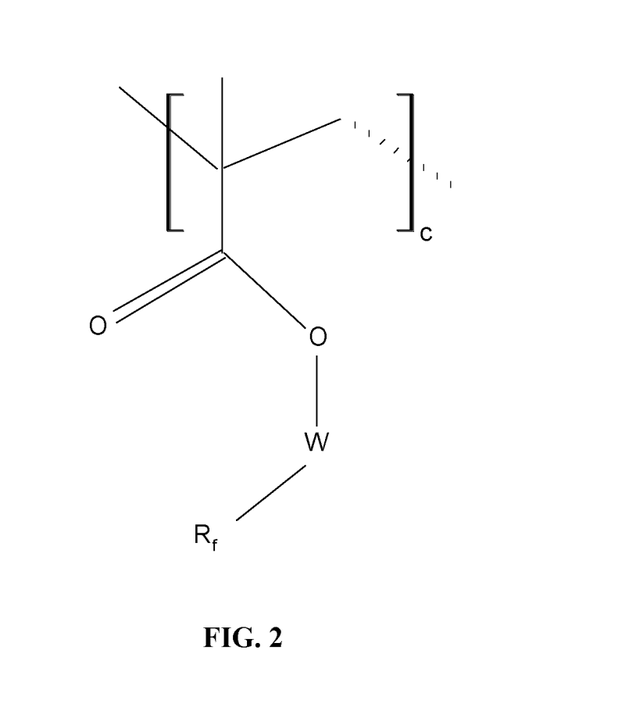
FIG. 2 depicts another chemical structure in accordance with one or more embodiments of the invention.

In FIG. 1, the chemical structures is defined wherein $R_d$ is a $C_1$ to $C_4$ linear or branched alkyl; $M^+$ is $H^+$, $NH^+$, $Na^+$, $Cs^+$, $HNR_3^+$ or mixture thereof; a is an integer from about 20 to about 100%; b is an integer from about 0-80%; and where the sum of a+b is equal to 100%. In FIG. 2, the chemical structures is defined wherein $R_f$ is a $C_1$ to $C_{10}$ linear or branched fluoroalkyl, optionally interrupted by one or more —O—, —CH2—, —CFH—, or combined thereof; c is an integer from 0 to about 40; and W is an alkylene of 1 to about 15 carbon atoms, hydroxyalkylene of 3 to about 15 carbon atoms, $(C_nH_{2n})(OC_qH_{2q})_m$, $(C_nH_{2n})(NR')_zSO2\ NR'(C_nH_{2n})$, or $CONR'(C_nH_{2n})$, wherein each R' is independently H or an alkyl of from 1 to about 4 carbon atoms, each n is independently 1 to about 15, q is 2 to about 4, m is 1 to about 15, and z is 0 or 1.

In accordance with the invention, the below tables describe one or more embodiments of the invention falling within the ranges of Table 1. Tables 2-6 describe exemplary one-part formulations of the invention suitable for use as one-part etch resistant coatings for acid sensitive stones, and particularly, suitable for use as etch resistant sealer (coating) formulations for use with unpolished stone, such as, for example, honed calcareous stones. All range measures described below are in weight % based on a total weight of the various resultant formulations.

TABLE 2: In one or more embodiments, the formulations of the invention may include at least the constituents including an acrylic dispersion binder, a polyurethane dispersion binder, water, wax additive, a fluoro-compound, a leveling agent, and a water borne silicone. As described in Range 1 and Range 2 of Table 1, these constituents may be provided in various amounts as detailed in Table 2 below. Table 2 depicts exemplary Formulas 1 (e.g., 1a, 1b, etc.), which are various formulations that are particularly suitable for use as etch resistant sealer (coatings) applied over unpolished stone, such as, honed calcareous stones.

TABLE 2

"Formulas 1"

| Composition | Materials | Range (wt. %) |
|---|---|---|
| Water | Water | 15-25% |
| Polyurethane dispersion binder | Alberdingk 410, Hybridur 870, or PUD 8925 | 40-50% |
| Acrylic dispersion binder (one or more) | Alberdingk AC 2508, Alberdingk AS 26102, or Ottopol 523 | 8-20% |
| Wax additive (one or more) | Aquacer 539, LUBA-print 914/A | 8-20% |
| Fluoro-compound | 3M SRA-270 | 5-20% |
| Leveling agent | BYK 024, Patadd LE 1030 | 0-1% |
| Water borne silicone | Coatosil DRI, Silres BS 6920 | 1-10% |
| TOTAL FORMULATION | | 100 (wt. %) |

TABLE 3: In accordance with one or more embodiments of the invention, as described in Table 1, Exemplary Formulas 2 are depicted below in Table 3, which may include more than one type of wax additive within the formulation.

These formulations are also suitable as etch resistant coatings (sealer) applied over unpolished stone, such as, honed calcareous stones.

TABLE 3

"Formulas 2"

| Composition | Materials | Range (wt. %) |
|---|---|---|
| Water | Water | 15-25% |
| Polyurethane dispersion binder | PUD 8925 | 40-50% |
| Acrylic dispersion binder (one or more) | Ottopol 523 | 8-20% |
| Wax additive | LUBA-print 914/A | 8-20% |
| Wax additive | Aquacer 539 | 0-20% |
| Fluoro-compound | 3M SRA-270 | 5-20% |
| Leveling agent | Patadd LE 1030 | 0-1% |
| Water borne silicone | Coatosil DRI | 1-10% |
| TOTAL FORMULATION | | 100 (wt. %) |

TABLE 4: In other embodiments of the invention that provide coatings for unpolished honed calcareous stones, the polyurethane dispersion binder may be replaced with an acrylic-polyurethane dispersion, such as, Hybridur 878 for example. These formulas are described below as exemplary Formulas 3.

TABLE 4

"Formulas 3"

| Composition | Materials | Range (wt. %) |
|---|---|---|
| Water | Water | 15-25% |
| Acrylic-polyurethane dispersion | Hybridur 878 | 40-50% |
| Acrylic dispersion binder (one or more) | Alberdingk AS 26102 | 8-20% |
| Wax additive | Aquacer 539 | 8-20% |
| Fluoro-compound | 3M SRA-270 | 5-20% |
| Leveling agent | BYK 024 | 0-1% |
| Water borne silicone | Silres BS 6920 | 1-10% |
| TOTAL FORMULATION | | 100 (wt. %) |

While not meant to be limiting, the below tables referring to one or more exemplary embodiments of the invention that each comprise one-part formulations suitable for use as coatings for unpolished stone, such as, honed calcareous stones. It should be appreciated that one or more addition components may be added to the formulations described above to add various desired features and characteristics.

TABLE 5: In one or more embodiments, Formula 4 below represents an exemplary one-part formulation suitable for use as a coating for unpolished honed calcareous stones in accordance with the invention.

TABLE 5

"Formula 4"

| Composition | Materials | Range (wt. %) |
|---|---|---|
| Water | Water | 18.80% |
| polyurethane dispersion binder | PUD 8925 | 43.74% |
| Acrylic dispersion binder | Ottopol 523 | 8.55% |
| Acrylic dispersion binder | Alberdingk AS 26102 | 5.13% |
| Wax additive | Luba print 914/A | 10.68% |
| Fluoro-compound | 3M SRA-270 | 8.55% |
| Leveling agent | Patadd LE 1030 | 0.06% |
| Water borne silicone | Coatosil DRI | 4.49% |
| TOTAL FORMULATION | | 100 (wt. %) |

TABLE 6: In one or more other embodiments, Formula 5 represents another exemplary one-part formulation suitable for use as a coating for unpolished honed calcareous stones.

TABLE 6

"Formula 5"

| Composition | Materials | Range (wt. %) |
|---|---|---|
| Water | Water | 17.41% |
| polyurethane dispersion binder | PUD8925 | 46.43% |
| Acrylic dispersion binder | Ottopol 523 | 7.91% |
| Acrylic dispersion binder | Alberdingk AS 26102 | 4.75% |
| Wax additive | Luba print 914/A | 9.89% |
| Fluoro-compound | 3M SRA-270 | 7.91% |
| Leveling agent | Patadd LE 1030 | 0.06% |
| Water borne silicone | Coatosil DRI | 4.15% |
| Matting agent | Microtouch 800XF | 1.48% |
| TOTAL FORMULATION | | 100 (wt. %) |

Referring to Tables 7-11 below, one or more embodiments of the invention falling within the ranges set forth in Table 1 are described therein. These exemplary one-part formulations of the invention are also suitable for use as one-part etch resistant coatings for acid sensitive stones. In particular, the below one-part formulations are suitable for use as etch resistant sealer (coating) formulations for use with polished stones, such as, for example, polished calcareous stones. All range measures described below are in weight % based on a total weight of the various resultant formulations of the invention.

TABLE 7: In one or more embodiments as described in Table 7, the formulations of the invention for use with polished calcareous stones may include, but are not limited to, mixtures/blends of acrylic dispersion binder, polyurethane dispersion binder, water, co-solvent, wax additive, fluoro-compound, a leveling agent, and a silane adhesion promoter. It should be appreciated that various other constituents may be added to the formulations of the invention to provide desired attributes and characteristics of the resultant coatings. These etch resistant sealers (coatings) for polished calcareous stones are described below in Formulas 6.

TABLE 7

"Formulas 6"

| Composition | Materials | Wt. % range |
|---|---|---|
| Water | Water | 15-25% |
| Acrylic dispersion binder | Alberdingk AS 26102, Ottopol 523 | 5-20% |

TABLE 7-continued

"Formulas 6"

| Composition | Materials | Wt. % range |
|---|---|---|
| Polyurethane dispersion binder | PUD 8925 | 20-60% |
| Co-solvent | DOWANOL ™ PM, DOWANOL ™ DPnB | 1-5% |
| Wax additive | Aquacer 539 | 3-20% |
| Fluoro-compound | SRA-270 | 0-6% |
| Leveling agent | Patadd LE 1030 | 0-1% |
| Silane adhesion promoter | Dow Xiameter OFS-6040 | 0-5% |
| TOTAL FORMULATION | | 100 (wt. %) |

TABLE 8: In one or more embodiments, Formula 7 below represents an exemplary one-part formulation suitable for use as a coating for polished calcareous stones in accordance with the invention.

TABLE 8

"Formula 7"

| Composition | Materials | Range (wt. %) |
|---|---|---|
| Water | Water (e.g., tap, DI, etc.) | 18.80% |
| polyurethane dispersion binder | PUD8925 | 43.74% |
| Acrylic dispersion binder | Ottopol 523 | 8.55% |
| Acrylic dispersion binder | Alberdingk AS 26102 | 5.13% |
| Wax additive | Luba print 914/A | 10.68% |
| Fluoro-compound | 3M SRA-270 | 8.55% |
| Leveling agent | Patadd LE 1030 | 0.06% |
| Water borne silicone | Coatosil DRI | 4.49% |
| TOTAL FORMULATION | | 100 (wt. %) |

Referring to Tables 9-12 below, additional exemplary formulations of the present etch resistant coatings for acid sensitive stones are described in accordance with the invention. These formulations include one or more additional constituents to the formulations above to add desired properties and/or characteristics to the present resultant coatings for calcareous-based stones that are susceptible to corrosive acidic stains. These tables describe the desired characteristics of the various chemical constituents (i.e., ingredients) within each formulation.

TABLE 9: In accordance with one or more embodiments of the invention as described in Table 1, Exemplary Formula 8 is described below.

TABLE 9

"Formula 8"

| Composition (Properties/Characteristics) | Materials | Formula Wt. % |
|---|---|---|
| Water | DI Water | 60.977% |
| Epoxy Acrylic hybrid polymer dispersion | Alberdingk M2955 | 12.648% |
| Acrylic Urethane hybrid polymer dispersion or acrylic dispersion | Hybridur 878 | 5.000% |
| Siloxane based Defoamer | BYK-024 | 0.388% |
| Hydrophylic Ethane-1, 2-diol | DB | 0.500% |
| Benzoate Ester Plasticizer | Benzoflex 50 (G-37992 DRXX DIBENZOATES MIXTURE) | 0.898% |
| Hydrophobic Glycol Ether | DPNB | 1.000% |
| Acrylic Urethane hybrid polymer dispersion or acrylic dispersion | Alberdingk M2959 | 15.810% |
| Nonfoaming, nonionic surfactant | Surfynol 440 | 0.252% |
| Fluoro-compound | Capstone ® ST300 | 0.143% |
| Wax Additive | Aquacer 8035 | 1.673% |
| A blend of Benzisothiazolin and 2-Hydroxyethyl-triazine | Proxel GXL | 0.128% |
| Thickener | Solthix A100 | 0.283% |
| Matting agent | Ceraflour 920 | 0.300% |
| TOTAL FORMULATION | | 100.000% |

TABLE 10: In accordance with one or more embodiments of the invention as described in Table 1, Exemplary Formula 9 is described below.

TABLE 10

"Formula 9"

| Composition (Properties/Characteristics) | Materials | Formula Wt. % |
|---|---|---|
| Water | DI Water | 60.877% |
| Epoxy Acrylic hybrid polymer dispersion | Alberdingk M2955 | 12.648% |
| Acrylic Urethane hybrid polymer dispersion Siloxane based Defoamer | Hybridur 878 BYK-024 | 5.000% 0.388% |
| Hydrophylic Ethane-1, 2-diol | DB | 0.500% |
| Benzoate Ester Plasticizer | Benzoflex 50 (G-37992 DRXX DIBENZOATES MIXTURE) | 0.898% |
| Hydrophobic Glycol Ether | DPNB | 1.000% |
| Acrylic Urethane hybrid polymer dispersion or acrylic dispersion | Alberdingk M2959 | 15.810% |
| Nonfoaming, nonionic surfactant | Surfynol 440 | 0.252% |
| Fluoro-compound | Capstone ® ST300 | 0.143% |
| Wax Additive | Aquacer 8035 | 1.673% |
| A blend of Benzisothiazolin and 2-Hydroxyethyl-triazine | Proxel GXL | 0.128% |
| Thickener | Solthix A100 | 0.283% |
| Mineral Clay | Talc | 0.100% |
| Matting agent | Ceraflour 920 | 0.300% |
| TOTAL FORMULATION | | 100.000% |

TABLE 11: In accordance with one or more embodiments of the invention as described in Table 1, Exemplary Formula 10 is described below.

TABLE 11

"Formula 10"

| Composition (Properties/Characteristics) | Materials | Formula Wt. % |
|---|---|---|
| Water | DI Water | 60.977% |
| Epoxy Acrylic hybrid polymer dispersion | Alberdingk M2955 | 12.648% |
| Acrylic Urethane hybrid polymer dispersion | Hybridur 870 | 5.000% |
| Hydrophylic Ethane-1, 2-diol | DB | 0.500% |
| Siloxane based Defoamer | BYK-024 | 0.388% |
| Benzoate Ester Plasticizer | Benzoflex 50 (G-37992 DRXX DIBENZOATES MIXTURE) | 0.898% |
| Hydrophobic Glycol Ether | DPNB | 1.000% |
| Acrylic Urethane hybrid polymer dispersiono r acrylic dispersion | Alberdingk M2959 | 15.810% |
| Nonfoaming, nonionic surfactant | Surfynol 440 | 0.252% |
| Fluoro-compound | Capstone ® ST300 | 0.143% |
| Wax Additive | Aquacer 8035 | 1.673% |

TABLE 11-continued

"Formula 10"

| Composition (Properties/Characteristics) | Materials | Formula Wt. % |
|---|---|---|
| A blend of Benzisothiazolin and 2-Hydroxyethyl-triazine | Proxel GXL | 0.128% |
| Thickener | Solthix A100 | 0.283% |
| Matting agent | Ceraflour 920 | 0.300% |
| TOTAL FORMULATION | | 100.000% |

TABLE 12: In accordance with one or more embodiments of the invention as described in Table 1, Exemplary Formula 11 is described below.

TABLE 12

"Formula 11"

| Composition (Properties/Characteristics) | Materials | Formula Wt. % |
|---|---|---|
| Water | DI Water | 60.877% |
| Acrylic Urethane hybrid polymer dispersion | Hybridur 870 | 33.458% |
| Hydrophylic Ethane-1, 2-diol | DB | 0.500% |
| Siloxane based Defoamer | BYK-024 | 0.388% |
| Benzoate Ester Plasticizer | Benzoflex 50 (G-37992 DRXX DIBENZOATES MIXTURE) | 0.898% |
| Hydrophobic Glycol Ether | DPNB | 1.000% |
| Nonfoaming, nonionic surfactant | Surfynol 440 | 0.252% |
| Fluoro-compound | Capstone ® ST300 | 0.143% |
| Wax Additive | Aquacer 8035 | 1.673% |
| A blend of Benzisothiazolin and 2-Hydroxyethyl-triazine | Proxel GXL | 0.128% |
| Thickener | Solthix A100 | 0.283% |
| Mineral Clay | Talc | 0.100% |
| Matting agent | Ceraflour 920 | 0.300% |
| TOTAL FORMULATION | | 100.000% |

The formulations of the invention also include two-part etch resistant formulations and coatings for sealing calcareous based stones. These coatings protect calcareous stones from staining agents including, but not limited to, corrosive acidic stains. Tables 13-15 below describe the two-part formulations in accordance with one or more embodiments of the invention. Like that of the one-part formulations described above, the present two-part formulations coat, seal, and protect acid sensitive stones, such as, honed calcareous stones or polished calcareous stones. In one or more embodiments, the two-part formulations are particularly suitable for use as a coating/sealing agent for polished stones, such as, polished calcareous stones. All range measures described below are in weight % based on a total weight of each component part, namely, Part A Formulation and Part B Formulation, respectively.

The various two-part systems of the invention include two (2) different compositions (e.g., Part A composition and Part B composition). These composition parts are mixed in a predetermined fixed ratio prior to use and application thereof. The resultant formulations of the invention form a coating that provides etch resistance and/or acid resistance protection as early as 4 hours after installation on natural, calcareous and/or sensitive stones. In one or more embodiments, it has been found that the dwell time of coatings of the invention are less than 30 minutes, depending on the environmental conditions.

TABLE 13: In accordance with one or more embodiments of the invention, Table 13 below depicts two-part formulations of the present etch resistant formulations and coatings for acid sensitive stones. The Part A compositions are hydroxyl function acrylic dispersions, and the Part B compositions are epoxy function silane hardeners. Prior to application, the Part A composition is mixed with the Part B composition in a ratio ranging from about (95% Part A)/(5% Part B) to (50% Part A)/(50% Part B). The Part A composition and Part B composition formulations may be mixed using an electric mixer or hand mixing to a homogeneous solution. The resulting solution may be applied using known techniques, including, use of paint brushes and/or foam brushes.

TABLE 13

| Composition | Property/Characteristics | Range (wt. %) |
|---|---|---|
| Two Part Etch Resistant Sealers-Part A | | |
| Water | | 0-30% |
| Hydroxyl functional acrylic dispersion | Binder/Dispersion | 10-80% |
| Polyurethane dispersion | Binder/Adhesion promoter | 10-70% |
| Metal oxide | Catalyst | 0-10% |
| Metal chelate | Catalyst | 0-10% |
| Hydrophobic Glycol Ether | Freeze Thaw Stabilizers/Co-Solvent | 0-10% |
| Hydrophylic Ethane-1, 2-diol | Freeze Thaw Stabilizers/Co-Solvent | 0-10% |
| A blend of Benzisothiazolin and 2-Hydroxyethyl-triazine | In Can Preservative | 0.02-0.5% |
| Wax | Wax additive | 0-15% |
| Leveling agent | Leveling additive | 0-5% |
| Defoamer | De-aerator | 0-5% |
| Water borne silicone | Surface modification additives | 0-15% |
| Thickener | Alkali swellable acrylic emulsion | 0-5% |
| Fluoro-compound | Oil/water repellency | 0-30% |
| Nonfoaming, nonionic surfactant | Wetting agent | 0-5% |
| Benzoate Ester Plasticizer | Plasticizer | 0-5% |
| Siloxane based Defoamer | De-aerator | 0-5% |
| TOTAL PART A FORMULATION | | 100 (wt. %) |
| Range Amounts of Part A Formulation mixed with Part B Formulation | | 95-50 (wt. %) |

TABLE 13-continued

| Composition | Property/Characteristics | Range (wt. %) |
|---|---|---|
| Two Part Etch Resistant Sealers-Part B | | |
| Water | | 0-30% |
| Epoxy/acrylic/methacrylic functional silane | Silane | 2-30% |
| water-dispersible polyisocyanate | water-dispersible polyisocyanate | 2-30% |
| Hydrophobic Glycol Ether | Freeze Thaw Stabilizers/Co-Solvent | 0-10% |
| Hydrophylic Ethane-1, 2-diol | Freeze Thaw Stabilizers/Co-Solvent | 0-10% |
| A blend of Benzisothiazolin and 2-Hydroxyethyl-triazine | In Can Preservative | 0.02-0.5% |
| Wax | Wax additive | 0-15% |
| Leveling agent | Leveling additive | 0-5% |
| Defoamer | De-aerator | 0-5% |
| Water borne silicone | Surface modification additives | 0-15% |
| Thickener | Alkali swellable acrylic emulsion | 0-5% |
| Fluoro-compound | Oil/water repellency | 0-15% |
| Nonfoaming, nonionic surfactant | nng agent | 0-5% |
| Benzoate Ester Plasticizer | Plasticizer | 0-5% |
| Siloxane based Defoamer | De-aerator | 0-5% |
| TOTAL PART B FORMULATION | | 100 (wt. %) |
| Range Amounts of Part B Formulation mixed with Part A Formulation | | 5-50 (wt. %) |

TABLE 14: In accordance with one or more embodiments of the invention, exemplary two-part formulations of the present etch resistant formulations and coatings for acid sensitive stones are shown below as Formula 12, which includes Part A that is mixed with Part B. While these two-part formulations may be used on any acid sensitive stone, it is particularly useful in coating polished calcareous stones.

TABLE 14

| Composition | Material | Range (wt. %) |
|---|---|---|
| Part A "Formula 12" | | |
| Water | Water | 3-15% |
| hydroxyl function acrylic dispersion | KX-63 | 10-80% |
| Fluoro-compound | 3M SRA-270 | 3-30% |
| TOTAL | | 90% |
| Part B "Formula 12" | | |
| Water | Water | 3-20% |
| Epoxy functional silane | Dow Corning Z-6040 | 3-20% |
| Coalescent solvent | DOWANOL DPnB | 0-10% |
| Coalescent solvent | DOWANOL PM glycol ether | 0-10% |
| wax additive | Aquacer 539 | 0-20% |
| Defoamer | Surfynol ® DF-58 | 0-5% |
| Leveling agent | Patadd LE 1030 | 0-5% |
| TOTAL | | 10% |

TABLE 15: In accordance with one or more embodiments of the invention, an exemplary two-part formulation of the present etch resistant formulations and coatings for acid sensitive stones is depicted in Table 15 as Formula 13, which includes Part A combined (i.e., mixed) with Part B. While this two-part formulation may be used on any acid sensitive stone, it is particularly useful in coating polished calcareous stones.

TABLE 15

| Composition | Material | Range (wt. %) |
|---|---|---|
| Part A "Formula 13" | | |
| Water | Water | 7.0% |
| hydroxyl function acrylic dispersion | KX-63 | 64.40% |
| Fluoro-compound | 3M SRA-270 | 8.00% |
| TOTAL Part A | | 79.40% |
| Part B "Formula 13" | | |
| Water | Water | 6.90% |
| Epoxy functional silane | Dow Corning Z-6040 | 9.00% |
| Coalescent solvent | DOWANOL DPnB | 1.00% |
| Coalescent solvent | DOWANOL PM glycol ether | 2.00% |
| wax additive | Aquacer 539 | 1.00% |
| Defoamer | Surfynol ® DF-58 | 0.10% |
| Leveling agent | Patadd LE 1030 | 0.60% |
| TOTAL Part B | | 20.60% |
| TOTAL FORMULATION: Part A + Part B | | 79.40% + 20.60% = 100 Wt. % based on total weight of resultant formulation (Part A + Part B) |

Referring to Tables 16-18 below, oil and water repellency of the various formulations and coatings of the invention were tested using commercially available test kits. The kits have liquids performance comprising different compositions as shows in Tables 16 and 17 below. The formulations and coatings of the invention are applied to a sensitive stone substrate and allowed to cure for 24 hours. Using a commercially available water/oil repellency test kit, 1-2 drops of each solution is placed on the stone substrate having the formulations and coatings of the invention. "Pass" for water when water drop stays beaded up for 10 seconds. "Pass" for oil when oil drop stays beaded up for 30 seconds. The corresponding solutions and results were recorded and numbers assigned, whereby the higher the number the better the results (with a 6-rating indicating the best possible performance and 0-rating being no repellency at all).

TABLE 16

Oil Repellency

| Oil Rating Number | Composition | CAS # | Flashpoint (° F.) |
|---|---|---|---|
| 0 | None (fails Kaydol) | — | — |
| 1 | 100% Kaydol (Mineral Oil) | 8012-95-1 | >212 |
| 2 | 65% Kaydol: 35% n-Hexadecane | — | >212 |
| 3 | 100% n-Hexadecane | 544-76-3 | >212 |
| 4 | n-Tetradecane | 629-59-4 | 211 |
| 5 | n-Dodecane | 112-40-3 | 165 |
| 6 | n-Decane | 124-18-5 | 115 |

TABLE 17

Water Repellency

| Water Rating Number | % Isopropanol CAS # 67-63-0 | % Water CAS # 7732-18-5 | Flashpoint (° F.) |
|---|---|---|---|
| 0 | None (fails rating 1) | None (fails rating 1) | — |
| 1 | 2 | 98 | — |
| 2 | 5 | 95 | 122 |
| 3 | 10 | 90 | 104 |
| 4 | 20 | 80 | 82 |
| 5 | 30 | 70 | 72 |
| 6 | 40 | 60 | 66 |

The resistance to acids were also tested. A commercially available muriatic acid test kit was used to evaluate acid resistance of the coatings/formulations of the invention. For sensitive calcareous stones not treated with the coatings/formulations of the invention, the acid test was too harsh and the stone(s) were etched when in contact with the acid. The etching is visual usually accompanied with bubbling and fuming. When washed, the etching can be noted as a surface defect on the substrate. In accordance with the invention, the various coatings/formulations of the invention were applied to such sensitive stone substrates and allowed to dry on the substrate for 4 hours. A few drops of the acid were provided on the cured, treated substrates of the invention. If there is no change in the surface appearance after 24 hours of exposure, then it is considered as a pass (noted as "YES" in the Table 18). If there is a slight reaction, or there is a surface defect it is considered as fail (Noted as "NO" in the Table 18.)

TABLE 18

| Tested Formulas | Water/Oil Repellency Rating | Stain Rating | Resistance to Acid Magic-Pass |
|---|---|---|---|
| Exemplary Formulas 3 | 4/1 | 2 | Yes |
| Exemplary Formula 4 | 4/2 | 0 | Yes |
| Exemplary Formula 5 | 4/2 | 1 | Yes |
| Exemplary Formula 7 | 3/2 | 0 | Yes |
| Exemplary Formula 8 | 4/3 | 0 | Yes |
| Exemplary Formula 9 | 4/4 | 1 | Yes |
| Exemplary Formula 10 | 4/4 | 1 | Yes |
| Exemplary Formula 11 | 4/4 | 2 | Yes |
| Exemplary Formula 12 (Part A + Part B) | 2/2 | 0 | Yes |

TABLE 18-continued

| Tested Formulas | Water/Oil Repellency Rating | Stain Rating | Resistance to Acid Magic-Pass |
|---|---|---|---|
| Exemplary Formula 13 (Part A + Part B) | 2/2 | 0 | Yes |
| Comparative Commercially Available Product-1 | 0/0 | 0 | No |
| Comparative Commercially Available Product-2 | 2/0 | 2 | No |
| Comparative Commercially Available Product-3 | 3/3 | 0 | Yes |

The 'Comparative Commercially Available Product 1' is a two-part coating, whereby both parts are mixed per the manufacturer's instruction prior to application. The 'Comparative Commercially Available Product 1' coating did not give protection to the substrate from etch of strong acid, such as, acid magic. This coating also had poor water/oil repellency, as noted in the above test data. Furthermore, the 'Comparative Commercially Available Product 1' coating had poor adhesion to polished marble, and could be easily scratched and peeled off.

The 'Comparative Commercially Available Product 2' is a fluoropolymer based penetrating sealer with low VOC. It had superior water repellency but did not have strong acid etch resistance as shown in the above table.

The 'Comparative Commercially Available Product 3' is a two-step solvent based coating recommended for acid etch resistance. In the first step, Part A which is a combustible liquid containing dichloromethane and must be applied on the stone in a fume hood. In the second step, Part B is a water-based coating that must be applied on the stone per manufacturer's instruction. The 2-part coating can protect substrates from etch of strong acids and gives water/oil repellency, but it is combustible and has toxic properties, both of which limit its applications.

The results of the invention show that the present formulations of Formulas 6 are one-part, low VOC water-based products with gloss surface finishing and they closely match the appearance of polished stones. They give very good adhesion to polished Marble and very good anti-scratch resistance. The one-part honed formulas of the present invention have low VOC and are water based. The surface finish after application matches the appearance of honed stones. They give very good scratch resistance and good adhesion to honed Marble. The representative data is shown is in the tables above. It was also found that the present matte acid resistant sealers of the invention, such as, Formulas 4 and 5, provided strong adhesion, improved scratch resistance as compared to comparative commercially available products, and had similar acid resistance (see, e.g., Formulas 8 to 11). In these two formulas, more polyurethane dispersion and less acrylic dispersion were added compared to Formulas 8 to 11, while surface modification additives remain the same.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A formulation comprising an etch resistant sealant for coating and protecting soft calcareous-based stones comprising:
a first binder comprising an epoxy-acrylic hybrid polymer dispersion present in an amount ranging from 5-20 wt. %;
a second binder comprising a polyurethane dispersion binder comprising at least a first acrylic urethane hybrid polymer dispersion, the polyurethane dispersion binder is present in an amount ranging from 20-60 wt. %; and
water present in an amount ranging from 10-80 wt. %,
wherein all weight percentages are based on a total weight of the formulation.

2. The formulation of claim 1 further including a third binder comprising a second acrylic urethane hybrid polymer dispersion or acrylic dispersion.

3. The formulation of claim 1 wherein the etch resistant sealant has the chemical structure comprising:

wherein $R_f$ is a $C_1$ to $C_{10}$ linear or branched fluoroalkyl, optionally interrupted by one or more —O—, —CH2—, —CFH—, or combined thereof,
c is an integer from 0 to about 40,
W is an alkylene of 1 to about 15 carbon atoms, hydroxyalkylene of 3 to about 15 carbon atoms, $(C_nH_{2n})(OC_qH_{2q})_m$, $(C_nH_{2n})(NR')_zSO2\ NR'(C_nH_{2n})$, or $CONR'(C_nH_{2n})$, wherein each R' is independently H or an alkyl of from 1 to about 4 carbon atoms, each n is independently 1 to about 15, q is 2 to about 4, m is 1 to about 15, and z is 0 or 1.

4. The formulation of claim 1 further including siloxane based defoamer.

5. The formulation of claim 1 further including benzoate ester plasticizer.

6. The formulation of claim 1 further including one or more of the following hydrophobic glycol ether, nonfoaming nonionic surfactant, fluoro-compound, wax additive, a blend of benzisothiazolin and 2-hydroxyethyl-triazine, freeze thaw stabilizers and co-solvents, plasticizers, in-can preservatives, a thickener, mineral clay and/or a matting agent.

7. The formulation of claim 1 further including at least one wax additive present in an amount ranging from 3-25 wt % based on a total weight of the formulation.

8. The formulation of claim 1 further including fluoro-compound present in an amount ranging from >0-20 wt % based on a total weight of the formulation.

9. A formulation comprising a one-part etch resistant sealant for coating and protecting soft calcareous-based stones comprising:
a first binder comprising a polyurethane dispersion binder present in an amount ranging from 20-60 wt. %;
a second binder comprising an epoxy-acrylic hybrid polymer dispersion binder present in an amount ranging from 5-20 wt. %;
water present in an amount ranging from 10-80 wt. %,
wherein all weight percentages are based on a total weight of the formulation.

10. The formulation of claim 9 further including a third binder comprising an acrylic dispersion binder present in an amount ranging from greater than 0 wt. % to 20 wt. %.

11. The formulation of claim 10 wherein the third binder comprises an acrylic urethane hybrid dispersion binder.

12. The formulation of claim 9 wherein the polyurethane dispersion binder comprises an acrylic-polyurethane dispersion present in an amount ranging from 40-50 wt. %.

13. The formulation of claim 9 wherein the polyurethane dispersion binder comprises one or more acrylic urethane hybrid polymer dispersions.

14. The formulation of claim 9 further comprising:
a wax additive present in an amount ranging from 8-20 wt. %;
a flouro-compound present in an amount ranging from 1-20 wt. %;
a leveling agent present in an amount ranging from greater than 0 wt. % to 1 wt. %, and
a water bourne silicone present in an amount ranging from 1-10 wt. %,
wherein all weight percentages are based on a total weight of the formulation.

15. The formulation of claim 9 further comprising one or more of a matting agent, silane adhesion promoter, or a co-solvent.

16. A formulation comprising a one-part etch resistant sealant for coating and protecting soft calcareous-based stones comprising:
a first binder comprising an acrylic-polyurethane dispersion binder present in an amount ranging from 20-60 wt. %;
a second binder comprising an epoxy-acrylic hybrid polymer dispersion binder present in an amount ranging from 5-20 wt. %;
a third binder comprising an acrylic urethane hybrid polymer dispersion binder present in an amount ranging from greater than 0 wt. % to 20 wt. %;
a wax additive present in an amount ranging from 8-20 wt. %;
a flouro-compound present in an amount ranging from 1-20 wt. %;
a leveling agent present in an amount ranging from greater than 0 wt. % to 1 wt. %, and
a water bourne silicone present in an amount ranging from 1-10 wt. %,
water present in an amount ranging from 10-80 wt. %,
wherein all weight percentages are based on a total weight of the formulation.

\* \* \* \* \*

UNITED STATES PATENT AND TRADEMARK OFFICE
CERTIFICATE OF CORRECTION

PATENT NO. : 12,098,276 B2
APPLICATION NO. : 16/882657
DATED : September 24, 2024
INVENTOR(S) : Suxin Wang et al.

Page 1 of 1

It is certified that error appears in the above-identified patent and that said Letters Patent is hereby corrected as shown below:

In the Specification

Column 5, Line 44, change "NH+" to "$NH_4^+$"

Signed and Sealed this
Twenty-second Day of April, 2025

Coke Morgan Stewart
*Acting Director of the United States Patent and Trademark Office*